July 21, 1964    H. B. HENDERSON    3,141,528
DISC BRAKES
Filed May 9, 1962    3 Sheets-Sheet 1
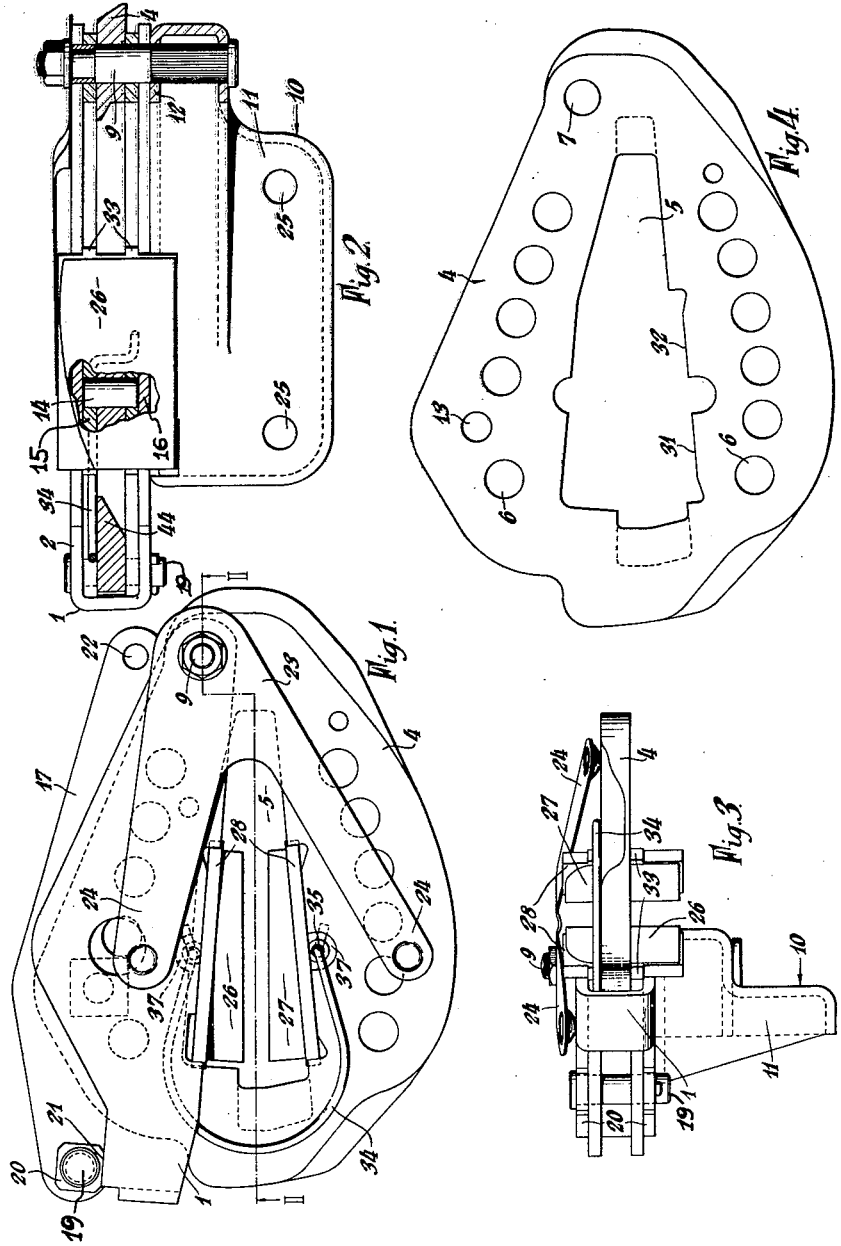
INVENTOR
Henry B. Henderson
BY
Lawrence K. Winter
ATTORNEY

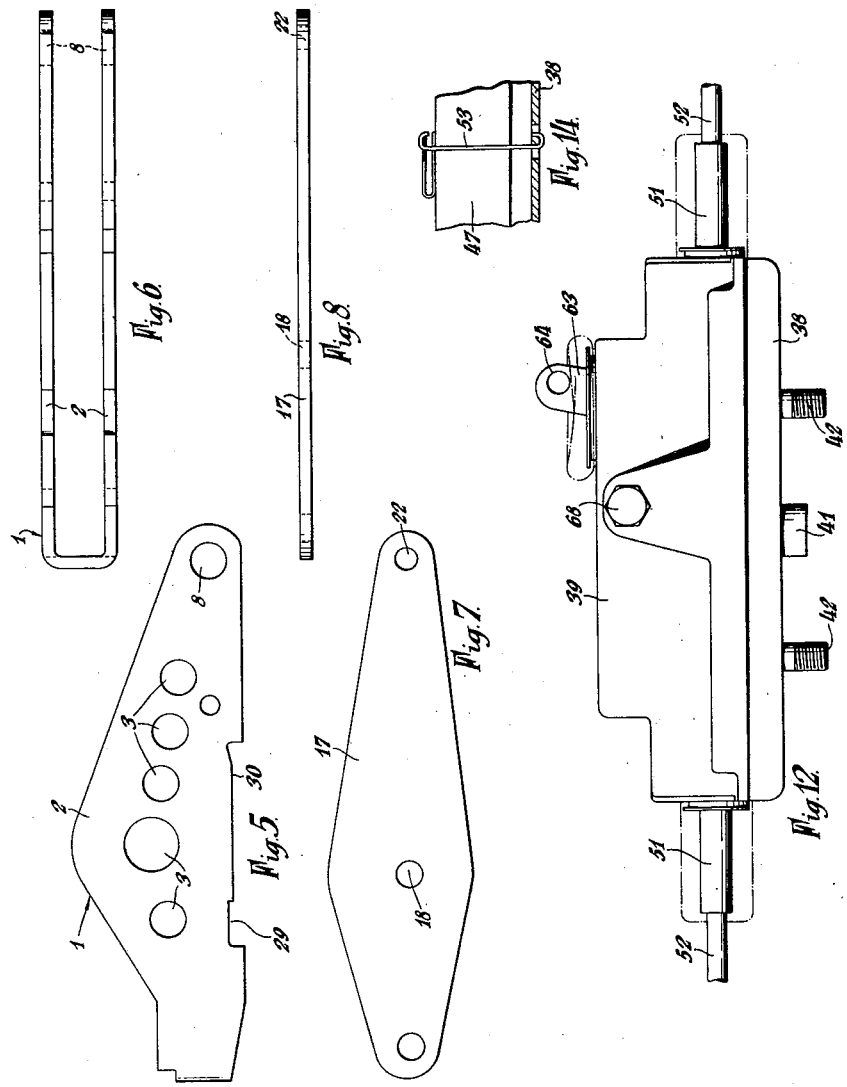

July 21, 1964  H. B. HENDERSON  3,141,528
DISC BRAKES
Filed May 9, 1962  3 Sheets-Sheet 3
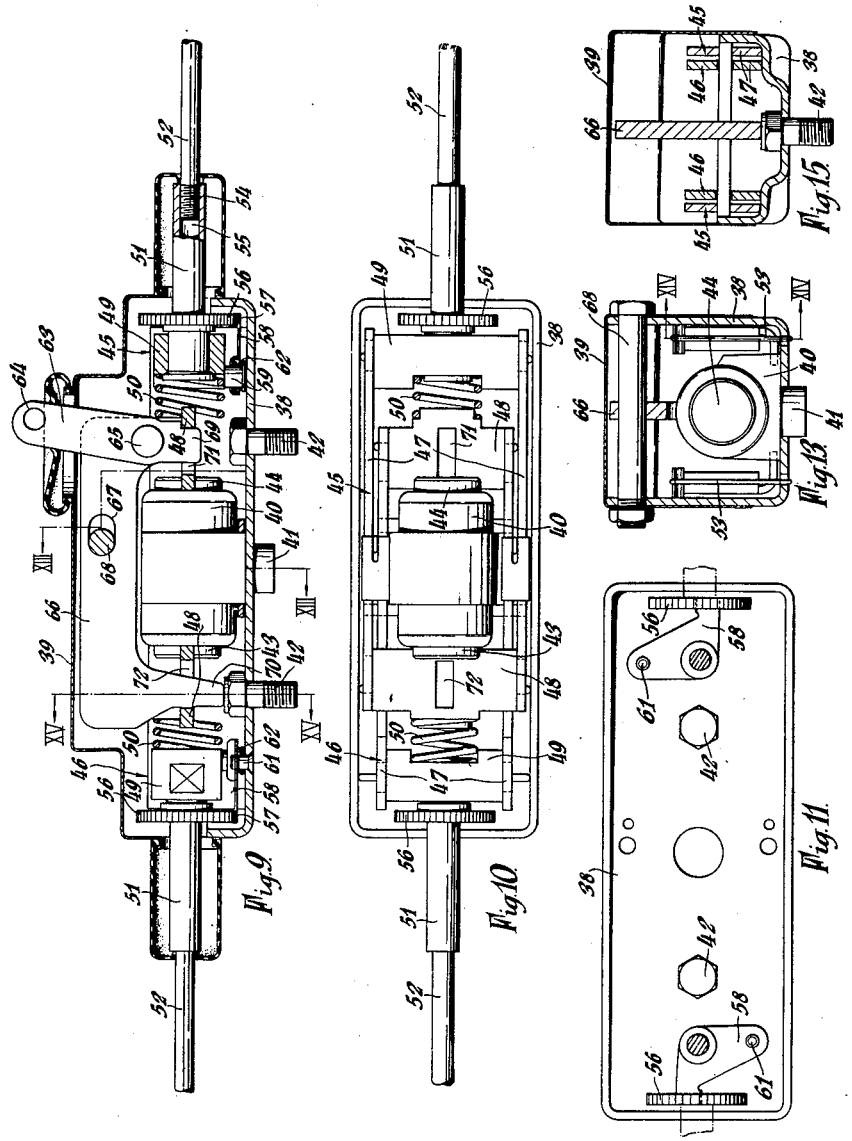
INVENTOR
Henry B. Henderson
BY
Lawrence J. Winter
ATTORNEY

United States Patent Office 3,141,528
Patented July 21, 1964

---

3,141,528
DISC BRAKES
Henry B. Henderson, Leamington Spa, England, assignor to Automotive Products Company Limited, Leamington Spa, England
Filed May 9, 1962, Ser. No. 193,509
Claims priority, application Great Britain May 10, 1961
11 Claims. (Cl. 188—73)

This invention relates to disc brakes of the kind in which the brake pad or pads on either side of the brake disc are each associated with a movable member each of which is mounted so as to have pivotal movement in a plane normal to the plane of rotation of the brake disc to bring the associated pad or pads into engagement with the brake disc to obtain brake operation.

It is an object of the invention to provide a construction of disc brake of the above kind which permits brake operation to be effected by fluid pressure operated brake actuating means located remote from the brake instead of being incorporated in the caliper mechanism as at present, the improved construction also permitting the brake to be operated mechanically so that the same can be used as a hand brake.

In a disc brake of the above kind according to the invention, each brake pad is associated with a movable member said movable members being pivotally mounted about a common pivotal axis so as to be swingable in a plane normal to the plane of rotation of the disc, and is associated with an operating member also pivotally mounted so as to be swingable in a plane normal to the plane of rotation of the disc, and operatively connected to one of said movable members, and operatively associated with the other of said movable members in such manner that swinging movement of the operating member in one direction results in swinging movements of the movable members in opposite directions to bring the pads associated therewith into engagement with the brake disc.

The brake according to the invention comprises for example an arm extending along one side of the brake disc and providing one movable member and a plate like element forming the other movable member the arm and plate like element being pivotally mounted on a common pivot pin so as to be swingable in a plane normal to the plane of rotation of the brake disc, the plate like element having an aperture to receive a peripheral portion of the brake disc and brake pads disposed on either side of the brake disc, a lever forming the operating member being disposed on the same side of the brake disc as the said arm and pivotally mounted so as also to be swingable in a plane normal to the plane of rotation of the brake disc, said lever being operatively associated with the arm and the plate like element, whereby operation of the lever by brake actuating means resulting in swinging movement of said arm and plate like element in opposite directions to apply the pad or pads associated therewith to the brake disc.

The operation of the brake operating member can be effected by energisation of pressuruc fluid brake actuating means situated remote from the brake and coupled to the brake operating member. The location of the brake actuating means remote from the disc brake has the advantage that the same will be unaffected by the heat generated in the brake mechanism by a brake application. For example the brake can be actuated by a hydraulic cylinder disposed with its bore axis at right angles to the plane of rotation of the disc the piston being coupled to the brake operating member at a point remote from the pivotal mounting of said member. In addition the brake can also be adapted for mechanical operation so that it can be used as a hand brake by connecting the hand brake mechanism to the brake operating member through a suitable coupling arrangement permitting operation of the brake operating member either by the wheel cylinder or other fluid pressure means, or by the hand brake mechanism.

In a vehicle braking system utilizing brakes according to the present invention it is possible to combine in a single unit the hydraulic cylinders or other fluid pressure brake actuating means for operating the brakes of pairs of wheels on the same axle or axis of rotation. In such a system the unit forming the brake actuating means can be located midway between the road wheels, for example the rear wheels of a vehicle. Advantageously the unit forming the brake actuating means can incorporate adjusting means operable automatically to compensate for wear in the brake pads and also coupling means for the connection of the brake to hand brake mechanism.

A brake mechanism and brake actuating means providing a unit for operating two brakes for example the rear wheel brakes of a vehicle and incorporating means for adjusting the brakes, will now be described by way of example by aid of the accompanying drawings in which:

FIGURE 1 is a plan view of the brake mechanism;
FIGURE 2 is a section on the line II—II of FIGURE 1;
FIGURE 3 is a view as seen from the left of FIGURE 1;
FIGURE 4 is a plan view of one of the movable members of the brake mechanism of FIGURE 1;
FIGURES 5 and 6 are plan and side elevations respectively of the other movable member of the brake mechanism of FIGURE 1;
FIGURES 7 and 8 are plan and side elevations respectively of the brake operating member of the brake mechanism of FIGURE 1;
FIGURE 9 is a view partly in section of brake actuating means for operating the brakes of two wheels on the same axle or axis of rotation, such as the rear wheels of a vehicle;
FIGURE 10 is a top plan view of FIGURE 9 showing the interior of the unit;
FIGURE 11 is a view of the interior of the unit of FIGURE 9, all the components being removed with the exception of part of the brake adjusting mechanism;
FIGURE 12 is a side elevation of the unit of FIGURE 9;
FIGURE 13 is a section on the line XIII—XIII of FIGURE 9;
FIGURE 14 is a fragmentary view in section of a detail of construction of the unit of FIGURE 9; and
FIGURE 15 is a section on the line XV—XV of FIGURE 9.

Referring to FIGURES 1 to 8 of the accompanying drawings, the brake mechanism comprises two movable members, one of which is constituted by an arm 1, which as shown in FIGURES 5 and 6 is bifurcated, the limbs 2 extending parallel to one another, and each having lightening holes 3, the other movable member 4 consisting of a flat metal plate having an aperture 5 extending through the thickness thereof and also lightening holes 6.

The movable member 4 is provided with a hole 7 which is positioned adjacent one end thereof and offset to one side of the aperture 5, the limbs 2 of the arm 1 each being provided with a hole 8 positioned adjacent the separated ends of the limbs. In the brake assembly the movable member 4 is disposed between the limbs of the arm 1, the holes 7 and 8 being aligned with one another to receive a pivot pin 9 carried by a fixed support 10. The fixed support 10 consists of a web portion 11 and a flange portion 12 extending at right angles to the web portion. The axis of the pivot pin 9 is disposed at right angles to the plane of the flange portion 12 which provides a support surface for the arm 1 and movable member 4, these members being swingable across said surface about the pivot pin.

The movable member 4 also has a further hole 13 to receive a further pivot pin 14, reinforcing plates 15 and 16 being provided to ensure stability of the pivot pin. The pivot pin 14 is positioned remotely from the pivot pin 9, and is offset in relation thereto towards one edge of the movable member 4, and has a lever 17 pivotally mounted thereon, this lever having a hole 18 (see FIGURES 7 and 8) to receive the pivot pin. The lever 17 forms the operating member and when mounted in position on the pivot pin 14, the lever lies parallel to the arm 1 and movable member 4, with one end of the lever extending towards the pivot pin 9 and the opposite end towards the free end of the arm 1. The end of the lever 17 adjacent the free end of the arm 1 carries a pin 19 which locates blocks 20 of rectangular form in position. The blocks 20 are positioned so that an edge 21 of each block is disposed opposite to the edges of each limb 2 of the arm 1, to provide abutment surfaces engageable with the opposite edges of the limbs 2. The end of the lever 17 opposite to the abutment carrying end is adapted for connection to one end of a pull rod, the opposite end of which rod is connectable to brake actuating means, for example of the kind hereinafter described. For this purpose the end of the lever 17 is provided with a hole 22 to receive a pin (not shown) engaging a suitable coupling member on the end of the pull rod. The arm 1 and the movable member 4 are spring loaded so as to be urged into contact with the flange 12 of the fixed support. For this purpose a leaf spring 23 is provided, the twin fingers 24 of which bear one on the arm 1 and the other on the movable member 4.

The brake mechanism above described is mounted on a wheel assembly by securing the fixed support 10 to a stationary part of the wheel assembly by bolts passing through bolt holes 25 provided in the web portion 11 of the fixed support. When so assembled the fixed support locates the arm 1 and movable member 4 in a plane normal to the plane of rotation of the brake disc (not shown). The aperture 5 of the movable member 4 receives a peripheral portion of the brake disc and brake pads 26 and 27 disposed one on either side of the brake disc, each brake pad having a metal backing plate 28. The metal backing plate 28 of brake pad 26 is located in a recess 29 in the edge of the arm 1, the opposite edges of the backing plate bearing against the opposite ends of the recess, the outer face of the backing plate being in contact with the edge portion 30 of the arm forming the base of the recess. Similarly, the metal backing plate 28 of the brake pad 27 is located in a recess 31 formed in an edge of the aperture 5 in the movable member 4, the opposite edges of the metal backing plate bearing against the opposite ends of the recess, the outer face of the backing plate being in contact with the edge portion 32 forming the base of the recess 31. Pairs of shoulders 33 (FIG. 3) at each side of the metal backing plates locate the brake pads radially in relation to the brake disc. The brake pads are spring loaded so as to be urged away from the brake disc by a hooped wire spring 34, the opposite ends 35 of which engage in a hole in a lug 37 provided on each metal backing plate.

In operation, when the brake actuating means is operated to apply the brakes, the lever 17 is subjected to a pull through the pull rod, which causes the lever to swing about the pivot pin 14, the swinging movement, referring to FIGURE 1, being anti-clockwise. This movement of the lever 17 causes the abutment surfaces 21 thereof to engage the opposite edge of the limbs 2 of arm 1, with the result that such arm tends to swing towards the brake disc to cause the brake pad 26 to engage the brake disc. The reaction set up in the mechanism due to this engagement and operating through the pivot pin 14 on which the lever 17 is mounted, causes the movable member 4 to swing towards the brake disc whereby the brake pad 27 also engages the brake disc so that the brake is applied.

FIGURES 9 to 15 of the accompanying drawings show brake actuating means for operating two brake mechanisms of the kind described above, fitted to pairs of wheels on the same axle or axis of rotation, for example the rear wheels of a vehicle. The brake actuating means comprises a unit incorporating hydraulic cylinder means operated by pressure fluid from for example a pedal operated master cylinder to apply the brakes, mechanical means for permitting operation of the brakes by a hand brake lever on a vehicle and brake adjusting means operable automatically to adjust the brakes to compensate for wear of the brake pads.

The unit combining the above features and for operating the rear wheel brakes of a road vehicle consists of a rectangular casing 38, having a removable cover 39 closing one side thereof and having a hydraulic cylinder 40 therein, provided with opposed pistons 43 and 44, movable away from one another in the cylinder by supplying hydraulic fluid between the adjacent ends of the pistons, the hydraulic cylinder being provided with a port 41 adapted for connection to a pedal operated master cylinder. The rectangular casing 38 is provided with bolts 42 for mounting the same on the vehicle axle, midway between the rear wheels with the pistons and cylinder extending transversely of the vehicle.

Slidably mounted in the casing 38 are two slides 45 and 46 respectively, each of which is capable of sliding movement in the longitudinal direction of the casing. Each said slide consists of two side members 47, and two end members referred to as an inner end member 48, and an outer end member 49. The slide 45 is associated with the piston 43, and the slide 46 with the piston 44, the slides being spring loaded by compression springs 50 acting between the adjacent end members of the two slides. The spring action urges the two slides inwardly of the casing to maintain the inner end member 48 of each slide in contact with the outer end of the associated piston 43 or 44, the pistons also being urged inwardly of the hydraulic cylinder to a position of rest as shown in the drawings, when the brakes are "off."

The outer end member 49 of each slide 45, 46 is connected by a coupling sleeve 51 to a pull rod 52, each rod of which is connected to the lever 17 of the associated brake, each coupling sleeve 51 projecting outwardly from the casing through the opposite end walls thereof. The arrangement is such that from the brake off position, shown in the drawings, upon the admission of hydraulic fluid to the hydraulic cylinder, pistons 43, 44 move outwardly, resulting in sliding movement of the slides in opposite directions, thereby actuating the couplings and pull rods to effect the required swinging movement of the lever 17 of each disc brake to apply the brakes as previously described. The sliding movement of the slides also results in compression of the push off compression springs 50, so that upon the release of the hydraulic fluid from the cylinder the springs act to return the pistons 43, 44 and slides 45, 46 to the position of rest. Retaining springs 53, anchored between each slide and the casing 38, prevent displacement of the slides in the lateral direction relative to the direction of the sliding movement.

Adjustment of the brakes, to compensate for wear on the brake pads, is obtained by providing for adjustment of the effective length of each brake pull rod 52. For this purpose, a threaded end 54 of each pull rod 52 is screwed into the correspondingly threaded bore 55 of the associated coupling sleeve 51, relative rotation between each pull rod and its coupling sleeve resulting in adjusting the length of the said pull rods. This adjustment is effected automatically by a ratchet wheel and pawl device associated with each coupling sleeve, and operable to effect rotation of the sleeve relative to the associated pull rod to effect the required adjustment.

The ratchet wheel 56 of each adjusting device is fixed to the coupling sleeve 51 so that each coupling sleeve and its associated ratchet wheel are jointly rotatable, by operation of a pawl 57 pivotally mounted one on each slide, each said coupling sleeve being rotatably mounted by its inner end, in a bearing bore provided in the appropriate outer end member 49 of the slide 45 or 46. Each pawl 57 of each adjusting device, is carried at the outer end of one arm of a bell crank lever 58, each lever of which is pivotally mounted at its elbow on a pivot pin 59 each of which projects from the end members 49 of the slides.

The other arm of each bell crank 58 is also pivotally mounted on a pivot pin 61 secured to the base of the casing 38. The pivot pins 59 and 61 of each bell crank 58 are positioned so that during a braking action, as the slides 45, 46 move in one direction or the other appropriate pivotal movement of each bell crank occurs.

The pitch of the teeth of the ratchet wheels, and the stroke of the pawls are so arranged in relation to a predetermined stroke of the slide, that when such stroke is within the predetermined limits, the pawl rides up the flank of the engaged tooth and no adjustment is effected. When such stroke is exceeded, due to wear of the brake pads, each pawl will engage a further tooth so that when the brakes are released, and the slides move inwardly, each ratchet wheel is driven and the coupling sleeves rotated to axially adjust the same on the brake pull rods. The bell cranks are held frictionally against movement under static conditions by coil springs 62. Each spring 62 is very light so that relatively little work is done by the pawl in riding from one tooth to another, the spring being just strong enough to ensure that the pawl engages in the next tooth.

To provide for hand operation of the brakes, the slides are operable by a lever 63 extending into the rectangular casing, the outer end 64 of the lever 63 being adapted for coupling to the linkage of the hand brake mechanism. The lever 63 is pivotally mounted on a reaction pin 65 carried by an intermediate slide 66. The slide 66 is of U-shape and straddles the hydraulic cylinder and is slidable longitudinally in the casing, parallel to the slides 45, 46, the slide 66 having a slot 67 through which a bolt 68 passes, the bolt extending across the width of the casing 38 by which it is carried. The slot is long enough to ensure maximum stroke of the intermediate slide 66. The limbs 69, 70 of the intermediate slide 66 project diametrically in relation to the hydraulic cylinder, the free end of the limb 69 being disposed in a slot 71 in the end member 48 of the slide 46, the free end of the limb 70 being disposed in a slot 72 in the end member 48 of the slide 45. In the brake "off" position shown in the drawings, an edge of each said limb bears against the opposite end of the corresponding slot, as shown in FIGURE 9. When the hand brake lever is operated to apply the brakes, the lever 63 swings about the reaction pin 65 anti-clockwise (FIGURE 9). As a result, the slide 46 moves to the right, (FIGURE 9) the reaction through the reaction pin resulting in sliding movement of the slide 45 to the left (FIGURE 9). The pull rods are thus operated to apply the brakes, the adjusting means also acting to make any required brake adjustment when the hand brake lever is released.

In the brake mechanism described in connection with FIGURES 1 to 8 of the accompanying drawings, the drag force arising as a result of engagement of the brake pads with the rotating brake disc are taken through the movable members provided by the arm 1 and plate element 4. It will be appreciated however that the brake pads can be arranged so that the drag force is taken wholly by the fixed support, or partly by the fixed support and partly by one or the other of the movable members.

In the above described embodiment the fixed support is formed separately from the wheel assembly and adpated to be secured thereto. However the fixed support can be formed as part of the wheel assembly, if desired.

I claim:

1. A disc brake comprising a fixed support with a horizontal flange portion, a continuous movable plate member forming a closed loop with an opening in the center thereof supported by said flange portion, another movable arm member supported by said flange portion, pivot pin means extending through said flange portion adjacent one end thereof, and extending through and disposed adjacent the same end of said plate member and arm member for pivotally mounting said plate and arm members about a common pivot point, said plate and arm members being disposed on said pivot pin means for swinging movement in a plane normal to the plane of rotation of a brake disc adapted to extend into said opening, said arm member being disposed adjacent one side of said plate member and adjacent one side of said opening, a lever operating arm disposed adjacent said one side of said plate member and said one side of said opening, a lever pivot pin extending through said one side of said plate member and said lever arm and pivotally connecting said lever arm for swinging movement in a plane parallel to the plane in which said plate and arm members swing, said lever pivot pin being disposed between said pivot pin means and the opposite end of said plate and arm member, means on said lever arm for engaging said arm member opposite the pivoted end of said arm member for causing said arm member and plate member to move toward each other, and brake pad means carried by said arm and plate members adjacent said opening adapted to engage a brake disc therein.

2. The disc brake of claim 1, wherein the fixed support comprises a part of the stationary part of the wheel assembly.

3. The disc brake according of claim 1, wherein the brake pad means are supported so that the drag force is taken wholly by the movable members.

4. The disc brake of claim 1, wherein the brake pad means are supported so that the drag forces are taken wholly by the fixed support.

5. The disc brake of claim 1 including pressure fluid brake actuating means.

6. The disc brake of claim 1, wherein the brake operating lever arm is adapted for coupling to brake actuating means situated remote from the brake.

7. The disc brake of claim 5, wherein said brake actuating means is adapted to operate a pair of brakes on the same axle or axis of rotation.

8. The disc brake of claim 5, wherein the brake actuating means comprises a hydraulic cylinder with opposed pistons, said cylinder has a port for the admission of hydraulic fluid between the opposite ends of said pistons, movable means operatively connected with each said piston, each said movable means being connected to an operating member of a brake, whereby the admission of hydraulic fluid to the hydraulic cylinder results in displacement of the pistons in opposite directions to move the movable member connected therewith and actuate the brakes.

9. The disc brake of claim 8 including means for automatically adjusting the brakes to compensate for wear of the brake pads.

10. The disc brake of claim 9, wherein the brake adjusting means is incorporated in a housing with the brake actuating means.

11. The disc brake of claim 10, wherein the brake adjusting means comprises a ratchet wheel and pawl operable upon release of the brakes to effect a brake adjustment.

References Cited in the file of this patent

UNITED STATES PATENTS

| | | |
|---|---|---|
| 893,220 | Anderson | July 14, 1908 |
| 2,866,524 | Flesch | Dec. 30, 1958 |

FOREIGN PATENTS

| | | |
|---|---|---|
| 1,207,766 | France | Sept. 7, 1959 |
| 1,244,755 | France | Sept. 19, 1960 |
| 732,272 | Great Britain | June 22, 1955 |